United States Patent [19]

Heckman

[11] 4,368,212

[45] Jan. 11, 1983

[54] PROCESS FOR PRODUCING BLAND-TASTING STARCH

[75] Inventor: Erwin Heckman, Long Beach, N.Y.

[73] Assignee: National Starch and Chemical Corporation, Bridgewater, N.J.

[21] Appl. No.: 331,400

[22] Filed: Dec. 16, 1981

[51] Int. Cl.$^3$ ................... A23L 1/195; A23L 1/187
[52] U.S. Cl. ................................. 426/579; 426/578; 426/661; 426/589; 127/33; 127/70; 127/71
[58] Field of Search ............ 426/578, 579, 661, 422, 426/436, 589; 127/32, 33, 69, 70, 71

[56] References Cited

U.S. PATENT DOCUMENTS

| | | | |
|---|---|---|---|
| 2,721,802 | 10/1955 | Scalise | 426/578 |
| 3,102,054 | 8/1963 | Harris | 127/69 |
| 3,607,393 | 9/1971 | Gabel | 426/661 |
| 4,303,451 | 12/1981 | Seidel et al. | 426/579 |

FOREIGN PATENT DOCUMENTS

| | | | |
|---|---|---|---|
| 273481 | 7/1927 | United Kingdom | 127/71 |
| 927961 | 6/1963 | United Kingdom | 127/71 |

*Primary Examiner*—Jeanette M. Hunter

[57] ABSTRACT

A bland-tasting starch is prepared by stirring a starch having a distinct cereal or root taste in aqueous slurry form with an acid at about pH 3–5 for at least about 25 minutes, adding an alkaline earth metal oxide to a pH of 5.5 to 8 and stirring, and thereafter filtering the slurry and drying the starch. In a preferred aspect the acid is sulfuric acid, the oxide is calcium or magnesium oxide and the starch is waxy maize. When the starch is dried by drum-drying, a pregelatinized starch is obtained. The resulting starch will not adversely affect the taste of foodstuffs to which it is added.

15 Claims, No Drawings

PROCESS FOR PRODUCING BLAND-TASTING STARCH

BACKGROUND OF THE INVENTION

This invention relates to a process for treating starch to remove a cereal or root taste therefrom and to the starch so prepared. This invention is also directed to a foodstuff containing a starch of improved flavor.

Tapioca starches are known for their bland taste in foodstuffs and are thus desirable in providing thickening properties and other modifications to the food system without adversely affecting the flavor thereof. However, the availability of tapioca starch for future use is somewhat uncertain and its costs are escalating dramatically. Thus, it would be desirable to employ other starches having the taste characteristics as well as the thickening power and other properties of tapioca starch.

Most other starches, however, impart to foods a characteristic cereal or root taste, often with a masking effect, which is palatably undesirable. To counter this off-taste in the past, the industry has employed various flavor additives, but often these do not overcome the unappealing cereal or root taste pervasive in the foodstuff.

Accordingly, it is an object of the present invention to provide a process for treating starch to remove a cereal or root taste therefrom such that the starch imparts a blander taste to foodstuffs without adversely affecting the other properties of the foodstuff such as texture, mouthfeel and sheen.

It is another object to provide, in a preferred embodiment, a waxy maize starch having a bland taste similar to that of tapioca starch when employed as a substitute therefor in foodstuffs.

SUMMARY OF THE INVENTION

The above and related objects are achieved in a process for treating starch to remove a cereal or root taste therefrom comprising the steps of stirring a starch having a distinct cereal or root taste in aqueous slurry form with an acid at about pH 3 to 5 for at least about 25 minutes; adding a sufficient amount of an alkaline earth metal oxide to the slurry to bring the pH thereof to about 5.5 to 8, and stirring for at least about 15 minutes; filtering the slurry; and drying the resultant treated starch, thereby improving the flavor of the starch. A particularly preferred starch herein is waxy maize starch.

The process herein not only produces a starch which has more acceptable flavor than the corresponding untreated starch (i.e., is more organoleptically satisfactory), but is also economically favorable and can be used routinely in preparing pregelatinized starches. In addition, the process of this invention has excellent replication in producing starches of uniformly good quality.

The prior art recognizes the combination of the calcium cation with starch but does not disclose or suggest a process of improving the taste of starches by use of such treatment as described herein.

DESCRIPTION OF THE PREFERRED EMBODIMENTS

For purposes of this invention the term "starch" refers to any starch having a distinct cereal or root taste and includes, for example, such starches as corn, waxy maize, sorghum and potato starches. It will be noted that tapioca starch is not included among the applicable starches herein because it has an acceptable taste without such treatment. The preferred starches herein are sorghum, potato and waxy maize starch, and most preferred is waxy maize starch because of its wide availability and relatively low cost.

The starch employed in the process herein may not only be a native starch but may also be a derivatized and/or crosslinked starch. Hence, among the applicable starches herein are included modified starches such as dextrins prepared by the hydrolytic cation of acids and/or heat, oxidized starches prepared by treatment with oxidants, e.g., sodium hypochlorite, and fluidity or thin-boiling starches prepared by enzyme conversion or by mild acid hydrolysis. In addition, the starch may be chemically derivatized as by means of an esterification reaction to give starch esters, for example, the acetates, propionates and butyrates, or by etherification to yield, for example, hydroxyethyl, hydroxypropyl or carboxymethyl starch ethers. The native starch or starch derivative may also be crosslinked with any crosslinking agent capable of forming linkages between the starch molecules. Typical crosslinking agents suitable herein include, for example, epichlorohydrin, linear dicarboxylic acid anhydrides, acrolein, phosphorus oxychloride, and soluble metaphosphates. Such crosslinking reaction is known and is described fully in the literature. Preferred herein are crosslinked, derivatized starches due to the improved texture, mouthfeel and sheen imparted to the foodstuff by such starch modifications. Starch whch has been reacted with propylene oxide and phosphorus oxychloride is particularly preferred herein. The starch base used in the process of this invention can be employed in its granular or pregelatinized form but is preferably granular since the starch is later dried in the process herein and can be pregelatinized simply by using drum-drying in the drying step.

In the first step of the process of this invention the starch is slurried in water with an acid to a pH of about 3 to 5 and the slurry is stirred at room temperature for at least about 25 minutes, preferably 30–40 minutes, to effect sufficient contact of the starch with the acid. The acid employed may be any common inorganic or organic acid, but is preferably an inorganic mineral acid such as, e.g., hydrochloric, sulfuric or phosphoric acid, and most preferably sulfuric acid.

After stirring with the acid is complete, an alkaline earth metal oxide salt is added to the slurry in an amount such that the pH is adjusted to about 5.5 to 8, preferably 6.5 to 7.5. The two adjustments in the pH with acid and oxide salt are found necessary to obtain an acceptable taste in the final starch product. The alkaline earth metal salt is an oxide of a divalent metal cation of Group II of the Periodic Table such as calcium oxide, magnesium oxide, beryllium oxide, etc., but is preferably calcium and magnesium oxide. Other salt combinations of cations and anions are found not to be nearly as effective in improving taste as the Group II oxides.

On addition of the oxide salt the slurry is stirred for at least about 15 minutes and thereafter filtered. The starch obtained on filtration may be washed before the drying step to remove any residual salt, but the washing step is not essential to obtain a starch having good taste.

The drying step may be accomplished by drum-drying on steam-heated rolls to form a pregelatinized starch, or by other means including, e.g., tray drying in air at ambient temperatures or by forced-air drying or oven or spray drying. The temperatures employed for drying by means of heat depends on the type of drying apparatus utilized but normally ranges from about 100° to 300° C. It is noted that when drum-drying is employed, a small amount of a preservative such as hydrogen peroxide may be added to the starch slurry before drying, if desired, to preserve the starch, and will not adversely affect the flavor of the starch. The starch may also be cooked (at 10–30% solids, for example) before drum-drying, if desirable, without any adverse effect.

The starch obtained on drying may be passed through a mesh screen to improve the smoothness of its surface, to remove any graininess in the texture, and/or to produce a better sheen. Such screening does not, however, affect the flavor and is optional depending mainly on the end-use of the starch. Any other physical modifications typically used to improve the properties of the starch for incorporation into a food system may likewise be employed as desired.

The starch prepared by the process of this invention can be incorporated into any food product wherein such starch is desired, for example, puddings, pie and cream fillings, gravies, spreads, jellies, baby foods, applesauce, reconstitutable instant mixes, soups, etc. and will not impart a cereal or chemical taste thereto. The starch herein may be used as an entire replacement for any tapioca starch or may also be incorporated in combination with tapioca starch, if use of a certain amount of tapioca starch in the food is found desirable.

The following examples illustrate the embodiments of the invention. All pats and percentages are given by weight and all temperatures in degrees Celsius unless otherwise noted. The evaluations of taste, mouthfeel, texture and sheen were conducted by test panel consisting of ten individuals.

EXAMPLE I

A waxy maize starch base, previously reacted with 4.5% propylene oxide and 0.008% phosphorus oxychloride, was slurried in water with a sufficient amount of sulfuric acid to lower the slurry to pH 4.5. The slurry was stirred for about 30 minutes, followed by addition of calcium oxide to adjust the pH to 6.9. The slurry was stirred for a further 15 minutes and then filtered. The resultant starch was drum-dried on steam-heated double drums at 110 psi. This calcium-oxide-treated starch, designated as Starch A below, was compared with the untreated waxy maize starch base (4.5% propylene oxide and 0.008% phosphorus oxychloride) and with untreated tapioca starch, as well as with the untreated waxy maize starch base combined with various flavor additives. The comparisons were carried out by incorporating each starch into a chocolate or vanilla pudding with the formulations as follows:

| Dry Ingredients (parts): | Puddings | | | | | | | |
|---|---|---|---|---|---|---|---|---|
| | I | II | III | IV | V | VI | VII | VIII |
| Chocolate pudding base | 47.2 | — | 47.2 | 47.2 | 47.2 | 49.2 | 49.2 | 49.2 |
| Vanilla pudding base | — | 45.6 | — | — | — | — | — | — |
| Sugar | 1.75 | — | 1.75 | 1.75 | 2.0 | — | — | — |
| Starch A | 9.5 | 8.1 | — | — | — | — | — | — |
| Untreated waxy maize starch* | — | — | 9.5 | — | — | — | — | — |
| Untreated tapioca starch* | — | — | — | 9.5 | — | — | — | — |
| Untreated waxy maize starch and 0.01% vanillin* | — | — | — | — | 9.5 | — | — | — |
| Untreated waxy maize starch and 10% gum arabic* | — | — | — | — | — | 10 | — | — |
| Untreated waxy maize starch and 1.0% appricot and lecithin* | — | — | — | — | — | — | 10 | — |
| Untreated waxy maize starch and 20% pectin* | — | — | — | — | — | — | — | 10 |

*Comparative examples.

All dry ingredients were blended in a jar and the dry blend was added to one cup milk at about 10° C. The resultant blend was mixed for 50 seconds (if chocolate) and for 1 minute (if vanilla). After this time the blend was allowed to stand at room temperature for five minutes and then was refrigerated at about 10° C. Each sample was then evaluated for taste, mouthfeel, texture and sheen, and the results are given in Table I.

TABLE I

| Pudding | Evaluations | | | |
|---|---|---|---|---|
| | Flavor | Mouthfeel | Texture | Sheen |
| I | very good | very good (good flavor release) | creamy | good |
| II | very good | good | creamy | good |
| III* | poor, cereal taste | good | good | good |
| IV* | very good | good | creamy | good |
| V | poor (strong off-flavor) | poor | fair | poor |
| VI* | fair | fair | fair | fair |
| VII | poor | poor | good | good |
| VIII | very poor | good | fair | fair |

*Comparative examples.

It can be seen that only Starch A imparts a good flavor to the puddings comparable to the flavor provided by untreated tapioca starch. The additives are apparently not effective in masking the poor flavor of the untreated waxy maize starch base.

EXAMPLE 2

This example illustrates that different starch bases may be employed in the process of this invention.

The chocolate pudding of Example 1 containing Starch A was prepared except that the waxy maize starch base employed for the starch was treated with 9.5% rather than 4.5% propylene oxide. Similar results as in Example 1 were obtained (i.e., very good flavor and mouthfeel and good texture and sheen) as compared with the untreated waxy maize starch base and tapioca starch.

When the chocolate pudding containing Starch A is prepared using a native waxy maize starch base for Starch A rather than a derivatized, crosslinked waxy maize starch, the flavor of the resultant pudding is still excellent and is comparable to that employing the tapioca starch, although the texture and mouthfeel of the pudding are not of a quality comparable with that of the pudding containing Starch A.

EXAMPLE 3

This example illustrates adjusting the starch to different pH values in accordance with the process of the invention to obtain the improved starch herein.

Chocolate puddings were prepared as described in Example 1 using as the starch base a waxy maize starch treated with 4.5% propylene oxide and 0.008% phosphorus oxychloride and using sufficient sulfuric acid to adjust the pH to either 3 or 4 and then sufficient calcium oxide to adjust the pH to 5.5, 6.0, 6.5, 7.0, 7.5 and 8.0. Each pudding obtained was close in flavor, texture and mouthfeel to the pudding containing Starch A, but the pudding with Starch A had the best taste. When the pH is not adjusted to within 5.5 and 8 with the salt, the flavor of the resulting pudding is adversely affected.

EXAMPLE 4

This example illustrates the effect of salts other than calcium oxide on the taste of the pudding.

The starches below were prepared using the starch base of Example 1 and using the salts as indicated below:

| Dry Ingredients (parts): | Puddings | | | | |
|---|---|---|---|---|---|
| | IX | X | XI | XII | XIII |
| Chocolate pudding base | 47.2 | 47.2 | 47.2 | 47.2 | 47.2 |
| Sugar | 1.75 | 1.75 | 1.75 | 1.75 | 1.75 |
| Waxy maize starch base adjusted to pH 4.5 with sulfuric acid and adjusted to pH 6.9 with magnesium oxide | 9.5 | — | — | — | — |
| Waxy maize starch treated with 2% sodium nitrate and washed before drying* | — | 9.5 | — | — | — |
| Waxy maize starch treated with 2% magnesium sulfate and washed before drying* | — | — | 9.5 | — | — |
| Waxy maize starch treated with 2% magnesium chloride and washed before drying* | — | — | — | 9.5 | — |
| Waxy maize starch base adjusted to pH 4.5 with aluminum sulfate and adjusted to pH 6.9 with calcium oxide* | — | — | — | — | 9.5 |

*Comparative examples.

The puddings were prepared as described in Example 1 and then evaluated, with the results given in Table II.

TABLE II

| Puddings | Evaluations | |
|---|---|---|
| | Flavor | Mouthfeel and Texture |
| IX | good | smooth, good |
| X* | metallic | satisfactory |
| XI* | salty | satisfactory |
| XII* | poor | satisfactory |
| XIII* | salty | satisfactory |

*Comparative examples.

It can be seen that not all salts capable of being used to adjust the pH are effective in imparting a good taste to the waxy maize starch in the process of this invention.

EXAMPLE 5

When Starch A of Example 1 was cooked at 15% and at 20% solids or tray-dried at ambient temperatures in air before drum-drying, and when Starch A was dried on a single rather than a double drum, similar results as to flavor, texture and mouthfeel were achieved in the chocolate pudding formulation of Example 1.

If Starch A of Example 1 is spray-dried or dried in air rather than drum-dried, similar results in terms of flavor are achieved in the pudding formulation of Example 1.

EXAMPLE 6

This example illustrates the effect of the process herein on several different types of native starches.

The indicated native starch base below was slurried in water at 40% solids to which a sufficient amount of 0.2 M sulfuric acid was added to lower the slurry to pH 4–4.5. The slurry was constantly stirred for about 25–30 minutes, followed by addition of calcium oxide to adjust the pH to 7.0–7.5. The slurry was then agitated for a further 15–25 minutes to disperse the components and was then filtered through a Buchner funnel. The cake retained on the filter was washed by slurrying at 40% solids in water. The resultant washed starch was drum-dried on a single drum at about 120 psi pressure. The treated starches obtained were compared with the respective untreated native starch bases. The comparisons were carried out by incorporating each starch into a chocolate pudding with the formulations as follows:

| Dry Ingredients (parts): | Puddings | | | | | | | |
|---|---|---|---|---|---|---|---|---|
| | XIV | XV | XVI | XVII | XVIII | XIX | XX | XXI |
| Chocolate pudding base | 47.2 | 47.2 | 47.2 | 47.2 | 47.2 | 47.2 | 47.2 | 47.2 |
| Sugar | 1.75 | 1.75 | 1.75 | 1.75 | 1.75 | 1.75 | 1.75 | 1.75 |
| Untreated waxy maize starch* | 9.5 | — | — | — | — | — | — | — |
| Treated waxy maize starch* | — | 9.5 | — | — | — | — | — | — |
| Untreated corn starch* | — | — | 9.5 | — | — | — | — | — |
| Treated corn starch | — | — | — | 9.5 | — | — | — | — |
| Untreated potato starch* | — | — | — | — | 9.5 | — | — | — |
| Treated potato starch | — | — | — | — | — | 9.5 | — | — |
| Untreated sorghum starch* | — | — | — | — | — | — | 9.5 | — |
| Treated sorghum starch | — | — | — | — | — | — | — | — |

*Comparative examples.

Chocolate puddings were prepared as described in Example 1 employing each formulation. The results of texture and flavor evaluations are indicated in Table III.

TABLE III

| Puddings | Evaluations | |
|---|---|---|
| | Flavor | Texture** |
| XIV* | poor, woody cereal taste | fair |

TABLE III-continued

| Puddings | Evaluations | |
|---|---|---|
| | Flavor | Texture** |
| XV | very good | fair |
| XVI* | very poor, woody cereal taste | poor |
| XVII | poor, but better than untreated | poor |
| XVIII* | poor, potato taste | fair |
| XIX | very good | fair |
| XX* | poor, woody cereal taste | fair |
| XXI | very good | fair |

*Comparative examples.
**It is noted that the texture of the native starches used in this example was inferior to the texture of the modified starch bases used in the previous examples, as expected, since derivatization and crosslinking are desibned to improve texture.

It can be seen from the results that the process herein significantly improves the flavor of the puddings made with treated starches as compared with the flavor of pudding made with the corresponding untreated starches.

EXAMPLE 7

In the preparation of frozen brown gravy, the following ingredients are mixed thoroughly and the resultant mixture is heated to 190° F.:
Beef broth: 62.6%
Water: 24.3%
Starch A of Example I: 3.0%
Wheat flour: 2.0%
Salt: 1.4%
Monosodium glutamate: 0.4%
Spices: 1.2%

Melted vegetable shortening (5.1% of the total) is slowly added to the hot mixture with constant agitation, and cooking at 190°–195° F. is continued for eight minutes. The gravy thus obtained, when tested, exhibits good flavor without any trace of a cereal taste, as well as good texture, sheen and mouthfeel.

EXAMPLE 8

In the preparation of vanilla pudding, the following ingredients are mixed thoroughly:
Starch A of Example I: 19.0%
Sugar: 40.0%
Maltodextrin: 20.0%
Nonfat dry milk solids: 20.1%
Salt: 0.9%
Vanilla flavor: to suit A portion of the above mixture (22.35%) is added to 47.65% of water and 30.00% of cream replacement. The combined mixture is heated to 185°–190° F. with good agitation and kept at that temperature for 10–15 minutes. After cooling, the pudding when evaluated is found to have a pleasing non-cereal taste and has good texture, sheen and mouthfeel.

In summary, the invention herein is seen to provide a process for treating starch to remove a cereal or root taste therefrom and also provides, in a preferred aspect, a waxy maize starch having a bland taste similar to that of tapioca starch when employed as a replacement therefor in foodstuffs.

Now that the preferred embodiments of the present invention have been described in detail, various modifications and improvements thereon will become readily apparent to those skilled in the art. Accordingly, the spirit and scope of the invention are to be limited only by the appended claims, and not by the foregoing specification.

What is claimed is:

1. A process for treating starch to remove a cereal or root taste therefrom comprising the steps of stirring a starch having a distinct cereal or root taste in aqueous slurry form with an acid at about pH 3 to 5 for at least about 25 minutes; adding a sufficient amount of an alkaline earth metal oxide to the slurry to bring the pH thereof to 5.5 to 8, and stirring for at least about 15 minutes; filtering the slurry; and drying the resultant treated starch, thereby improving the flavor of said starch.

2. The process of claim 1 wherein said starch is selected from the group consisting of sorghum, potato and waxy maize starch.

3. A process for treating waxy maize starch to remove the cereal taste therefrom comprising the steps of stirring said starch in aqueous slurry form with an acid at about pH 3 to 5 for at least about 25 minutes; adding sufficient amount of alkaline earth metal oxide to the slurry to bring the pH thereof to 5.5 to 8, and stirring for at least about 15 minutes; filtering the slurry; and drying the resultant treated starch, thereby improving the flavor of said starch.

4. The process of claim 1 wherein a sufficient amount of said oxide is added to bring the pH of said slurry to 6.5 to 7.5.

5. The process of claim 1 wherein said acid is sulfuric acid and said oxide is calcium or magnesium oxide.

6. The process of claim 1 wherein said drying is carried out in a drum drier to produce a pregelatinized starch.

7. The process of claim 1 wherein said starch is derivatized and/or crosslinked.

8. The process of claim 3 wherein said starch is derivatized and/or crosslinked.

9. A starch prepared by the process of claim 1.

10. A starch prepared by the process of claim 3.

11. A starch prepared by the process of claim 7.

12. A foodstuff containing therein the starch of claim 9.

13. A foodstuff containing therein the starch of claim 10.

14. A foodstuff containing therein the starch of claim 11.

15. The foodstuff of claim 14 wherein said foodstuff is a gravy or pudding.

* * * * *